United States Patent
Beainy et al.

(10) Patent No.: US 12,338,585 B2
(45) Date of Patent: Jun. 24, 2025

(54) CONVERTING VIBRATION ENERGY TO ELECTRICAL ENERGY IN A VIBRATORY COMPACTION MACHINE

(71) Applicant: Volvo Construction Equipment AB, Eskilstuna (SE)

(72) Inventors: Fares Beainy, Breinigsville, PA (US); Hongan Xu, Mechanicsville, PA (US); Ashraf Zeid, Carlisle, PA (US)

(73) Assignee: Volvo Construction Equipment AB, Eskilstuna (SE)

( * ) Notice: Subject to any disclaimer, the term of this patent is extended or adjusted under 35 U.S.C. 154(b) by 814 days.

(21) Appl. No.: 17/609,956

(22) PCT Filed: May 10, 2019

(86) PCT No.: PCT/IB2019/053882
§ 371 (c)(1),
(2) Date: Nov. 9, 2021

(87) PCT Pub. No.: WO2020/229872
PCT Pub. Date: Nov. 19, 2020

(65) Prior Publication Data
US 2022/0205190 A1 Jun. 30, 2022

(51) Int. Cl.
*E01C 19/28* (2006.01)
*F03G 7/08* (2006.01)

(52) U.S. Cl.
CPC .............. *E01C 19/286* (2013.01); *F03G 7/08* (2013.01)

(58) Field of Classification Search
CPC ........... E01C 19/28; E01C 19/286; F03G 7/08
See application file for complete search history.

(56) References Cited

U.S. PATENT DOCUMENTS 3,153,993 A * 10/1964 Keppler ................ E01C 19/288
404/117
4,091,302 A * 5/1978 Yamashita ............... H02N 2/18
368/204
(Continued)

FOREIGN PATENT DOCUMENTS

CN 201236776 Y 5/2009
CN 101971469 A 2/2011
(Continued)

OTHER PUBLICATIONS

International Search Report and Written Opinion of the International Searching Authority, PCT/IB2019/053882, mailed Jan. 23, 2020, 10 pages.
(Continued)

*Primary Examiner* — Gary S Hartmann
(74) *Attorney, Agent, or Firm* — Sage Patent Group

(57) ABSTRACT

A vibratory compaction machine includes one or more vibratory energy converter assemblies. Each vibratory energy converter assembly includes a housing coupled to the vibratory compaction machine, which transfers vibration energy from an eccentric vibration system of the vibratory compaction machine to the vibratory energy converter assembly. Each vibratory energy converter assembly includes an actuator that is carried by the housing. The actuator has a translational degree of freedom of movement with respect to the housing, and vibration of the housing by the vibratory compaction machine causes movement of the actuator with respect to the housing in a first direction. Each vibratory energy converter assembly includes a generator subassembly to convert mechanical vibratory energy of the movement of the actuator into electrical energy.

17 Claims, 8 Drawing Sheets

(56) References Cited

U.S. PATENT DOCUMENTS

| | | | |
|---|---|---|---|
| 5,248,216 A | 9/1993 | Vural | |
| 8,142,103 B2 * | 3/2012 | Wolf | E01C 19/288 |
| | | | 404/117 |
| 8,602,936 B2 * | 12/2013 | Ichikawa | B60L 7/18 |
| | | | 475/8 |
| 10,033,249 B2 * | 7/2018 | Liao | H02K 49/102 |
| 10,060,407 B2 * | 8/2018 | Elefant | F03B 13/22 |
| 11,480,147 B2 * | 10/2022 | Vamvas | H02S 10/10 |
| 2008/0174120 A1 | 7/2008 | Gardner et al. | |
| 2010/0215434 A1 | 8/2010 | Wolf | |
| 2011/0133488 A1 | 6/2011 | Roberts et al. | |
| 2012/0114416 A1 | 5/2012 | Marsolek et al. | |
| 2013/0025385 A1 | 1/2013 | Renz et al. | |
| 2013/0302089 A1 | 11/2013 | Sina | |
| 2014/0191512 A1 * | 7/2014 | Liao | B60K 25/10 |
| | | | 74/DIG. 9 |
| 2014/0341650 A1 | 11/2014 | Villwock et al. | |
| 2016/0020670 A1 * | 1/2016 | Green | H02K 16/00 |
| | | | 310/75 A |
| 2016/0276915 A1 * | 9/2016 | Oonishi | H02K 7/116 |

FOREIGN PATENT DOCUMENTS

| | | | | |
|---|---|---|---|---|
| CN | 202165506 U | 3/2012 | | |
| CN | 102577052 A | 7/2012 | | |
| GB | 1136655 A | 12/1968 | | |
| GB | 2488563 A * | 9/2012 | | B63B 17/0081 |

OTHER PUBLICATIONS

First Office Action for Chinese Patent Application No. 201980096198.9, mailed Dec. 26, 2023, 15 pages.

* cited by examiner

CONVERTING VIBRATION ENERGY TO ELECTRICAL ENERGY IN A VIBRATORY COMPACTION MACHINE

CROSS REFERENCE TO RELATED APPLICATIONS

This application is a 35 U.S.C. § 371 national stage application of PCT International Application No. PCT/IB2019/053882 filed on May 10, 2019, the disclosure and content of which is incorporated by reference herein in its entirety.

FIELD

Embodiments relate to converting energy, and more particularly to converting vibration energy to electrical energy in a vibratory compaction machine.

BACKGROUND

Surface compaction machines are used to compact a variety of substrates including soil, asphalt, or other materials. Surface compaction machines are provided with one or more compacting surfaces for this purpose. For example, a surface compaction machine, such as a roller compactor, may be provided with one or more cylindrical drums that provide compacting surfaces for compacting substrates.

Roller compactors use the weight of the compactor applied through rolling drums to compress a surface of the substrate being rolled. In addition, one or more of the drums of some roller compactors may be vibrated by a vibration system to induce additional mechanical compaction of the substrate being rolled. The vibration system of these vibratory compaction machines can include an eccentric vibration system that includes an eccentric mass that is rotated to generate a vibration force which increases the compacting force exerted by the drum.

Known vibratory compaction machines typically produce both horizontal and vertical vibration energy. While the vertical vibration energy is used to induce mechanical compaction under the vibratory compaction machines, the horizontal vibration energy does not contribute to the compaction function. In addition, horizontal vibration energy can be detrimental to the vibratory compaction machine, causing fatigue and damage to the machine, and may also create excessive noise.

SUMMARY

According to an embodiment, a vibratory energy converter assembly for a vibratory compaction machine is disclosed. The vibratory energy converter assembly comprises a housing coupled to the vibratory compaction machine. The vibratory energy converter assembly further comprises an actuator that is carried by the housing and that comprises a translational degree of freedom of movement with respect to the housing, wherein vibration of the housing by the vibratory compaction machine causes movement of the actuator with respect to the housing in a first direction. The vibratory energy converter assembly further comprises a generator subassembly coupled to the actuator to convert mechanical vibratory energy of the movement of the actuator into electrical energy.

According to an embodiment, a vibratory energy converter system is disclosed. The vibratory energy converter system comprises an eccentric vibration system. The vibratory energy converter system further comprises a plurality of vibratory energy converter assemblies. Each vibratory energy converter assembly comprises a housing coupled to the vibratory compaction machine. Each vibratory energy converter assembly further comprises an actuator that is carried by the housing and that comprises a translational degree of freedom of movement with respect to the housing, wherein vibration of the eccentric vibration system causes movement of the actuator with respect to the housing in a first direction. Each vibratory energy converter assembly further comprises a generator subassembly coupled to the actuator to convert mechanical vibratory energy of the movement of the actuator into electrical energy.

According to an embodiment, a vibratory compaction machine is disclosed. The vibratory compaction machine comprises a body chassis structure, a roller drum rotatably coupled to the body chassis structure, an eccentric vibration system disposed in the roller drum, and a vibratory energy converter assembly. The vibratory energy converter assembly comprises a housing. The vibratory energy converter assembly further comprises an actuator that is carried by the housing and that comprises a translational degree of freedom of movement with respect to the housing. Vibration of the eccentric vibration system causes movement of the actuator with respect to the housing in a first direction. The vibratory energy converter assembly further comprises a generator subassembly coupled to the actuator to convert mechanical vibratory energy of the movement of the actuator into electrical energy. Vibration of the eccentric vibration system causes vibration of the roller drum in a second direction substantially orthogonal to the first direction. Movement of the actuator in the first direction inhibits vibration of the roller drum in the first direction.

Other devices, methods, and systems according to embodiments will be or become apparent to one with skill in the art upon review of the following drawings and detailed description. It is intended that all such additional surface compaction machines, methods, and control systems be included within this description and protected by the accompanying claims. Moreover, it is intended that all embodiments disclosed herein can be implemented separately or combined in any way and/or combination

ASPECTS

According to an aspect, a vibratory energy converter assembly for a vibratory compaction machine is disclosed. The vibratory energy converter assembly comprises a housing coupled to the vibratory compaction machine. The vibratory energy converter assembly further comprises an actuator that is carried by the housing and that comprises a translational degree of freedom of movement with respect to the housing, wherein vibration of the housing by the vibratory compaction machine causes movement of the actuator with respect to the housing in a first direction. The vibratory energy converter assembly further comprises a generator subassembly coupled to the actuator to convert mechanical vibratory energy of the movement of the actuator into electrical energy.

According to an aspect, the vibratory energy converter assembly further comprises a first resilient element comprising a first portion that is fixedly attached relative to the housing and a second portion attached to the actuator that comprises the translational degree of freedom of movement with respect to the housing.

According to an aspect, the vibratory energy converter assembly further comprises a second resilient element comprising a first portion that is fixedly attached relative to the housing and a second portion attached to the actuator that comprises the translational degree of freedom of movement with respect to the housing. The first portion of the first resilient element is coupled to a first end of the housing. The first portion of the second resilient element is coupled to a second end of the housing opposite the first end.

According to an aspect, the first resilient element comprises a first spring, and the second resilient element comprises a second spring.

According to an aspect, the generator subassembly comprises a generator fixed with respect to the actuator. The vibratory energy converter assembly further comprises a mechanical linkage coupled between the housing and the generator to drive the generator in response to the movement of the actuator with respect to the housing.

According to an aspect, the mechanical linkage comprises a gear linkage coupled between the housing and the generator.

According to an aspect, the housing further comprises a drive rod coupled to the gear linkage. The movement of the actuator with respect to the housing causes the drive rod to drive the gear linkage to drive the generator.

According to an aspect, the generator subassembly comprises a magnetic element that is fixed with respect to the actuator, and a metallic coil that is fixed with respect to the housing, the metallic coil defining an interior volume. The movement of the actuator with respect to the housing causes the magnetic element to move through the interior volume of the metallic coil. The movement of the magnetic element through the interior volume of the metallic coil induces an electrical current within the metallic coil.

According to an aspect, the generator subassembly comprises a magnetic element that is fixed with respect to the housing, and a metallic coil that is fixed with respect to the actuator, the metallic coil defining an interior volume. Movement of the actuator with respect to the housing causes relative movement of the metallic coil with respect to the magnetic element, within the interior volume of the metallic coil. The relative movement of the magnetic element within the interior volume of the metallic coil induces an electrical current within the metallic coil.

According to an aspect, the housing comprises a guide rod. The actuator comprises a guide rod bearing engaged with the guide rod to inhibit rotation of the actuator during the movement of the actuator with respect to the housing.

According to an aspect, the housing forms an interior that encloses the actuator.

According to an aspect, the vibratory energy converter assembly further comprises an electrical energy storage device electrically coupled to the generator subassembly to store the electrical energy converted from the mechanical vibratory energy by the generator subassembly.

According to an aspect, the vibratory energy converter assembly further comprises an eccentric vibration system for the vibratory compaction machine, wherein the housing of the vibratory energy converter assembly is coupled to the eccentric vibration system. The movement of the actuator caused by the vibration of the housing inhibits vibration of the eccentric vibration system in the first direction.

According to an aspect, the vibratory energy converter assembly further comprises a roller drum for the vibratory compaction machine coupled to eccentric vibration system, wherein the roller drum encloses the eccentric vibration system, the housing, and the actuator. Vibration of the eccentric vibration system causes the roller drum to vibrate in a second direction different from the first direction.

According to an aspect, the second direction is substantially orthogonal to the first direction.

According to an aspect, the eccentric vibration system further comprises an eccentric system housing, and the housing of the vibratory energy converter assembly is fixedly coupled to the eccentric system housing and extends from the eccentric system housing in the first direction.

According to an aspect, the housing is selectively rotatable with respect to an eccentric system housing of the eccentric vibration system.

According to an aspect, the vibratory energy converter assembly further comprises a body chassis structure for the vibratory compaction machine, wherein the housing of the vibratory energy converter assembly is coupled to the body chassis structure.

According to an aspect, a vibratory energy converter system is disclosed. The vibratory energy converter system comprises an eccentric vibration system. The vibratory energy converter system further comprises a plurality of vibratory energy converter assemblies. Each vibratory energy converter assembly comprises a housing coupled to the vibratory compaction machine. Each vibratory energy converter assembly further comprises an actuator that is carried by the housing and that comprises a translational degree of freedom of movement with respect to the housing, wherein vibration of the eccentric vibration system causes movement of the actuator with respect to the housing in a first direction. Each vibratory energy converter assembly further comprises a generator subassembly coupled to the actuator to convert mechanical vibratory energy of the movement of the actuator into electrical energy.

According to an aspect, a vibratory compaction machine is disclosed. The vibratory compaction machine comprises a body chassis structure, a roller drum rotatably coupled to the body chassis structure, an eccentric vibration system disposed in the roller drum, and a vibratory energy converter assembly. The vibratory energy converter assembly comprises a housing. The vibratory energy converter assembly further comprises an actuator that is carried by the housing and that comprises a translational degree of freedom of movement with respect to the housing. Vibration of the eccentric vibration system causes movement of the actuator with respect to the housing in a first direction. The vibratory energy converter assembly further comprises a generator subassembly coupled to the actuator to convert mechanical vibratory energy of the movement of the actuator into electrical energy. Vibration of the eccentric vibration system causes vibration of the roller drum in a second direction substantially orthogonal to the first direction. Movement of the actuator in the first direction inhibits vibration of the roller drum in the first direction.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION OF EMBODIMENTS

Figure 1:
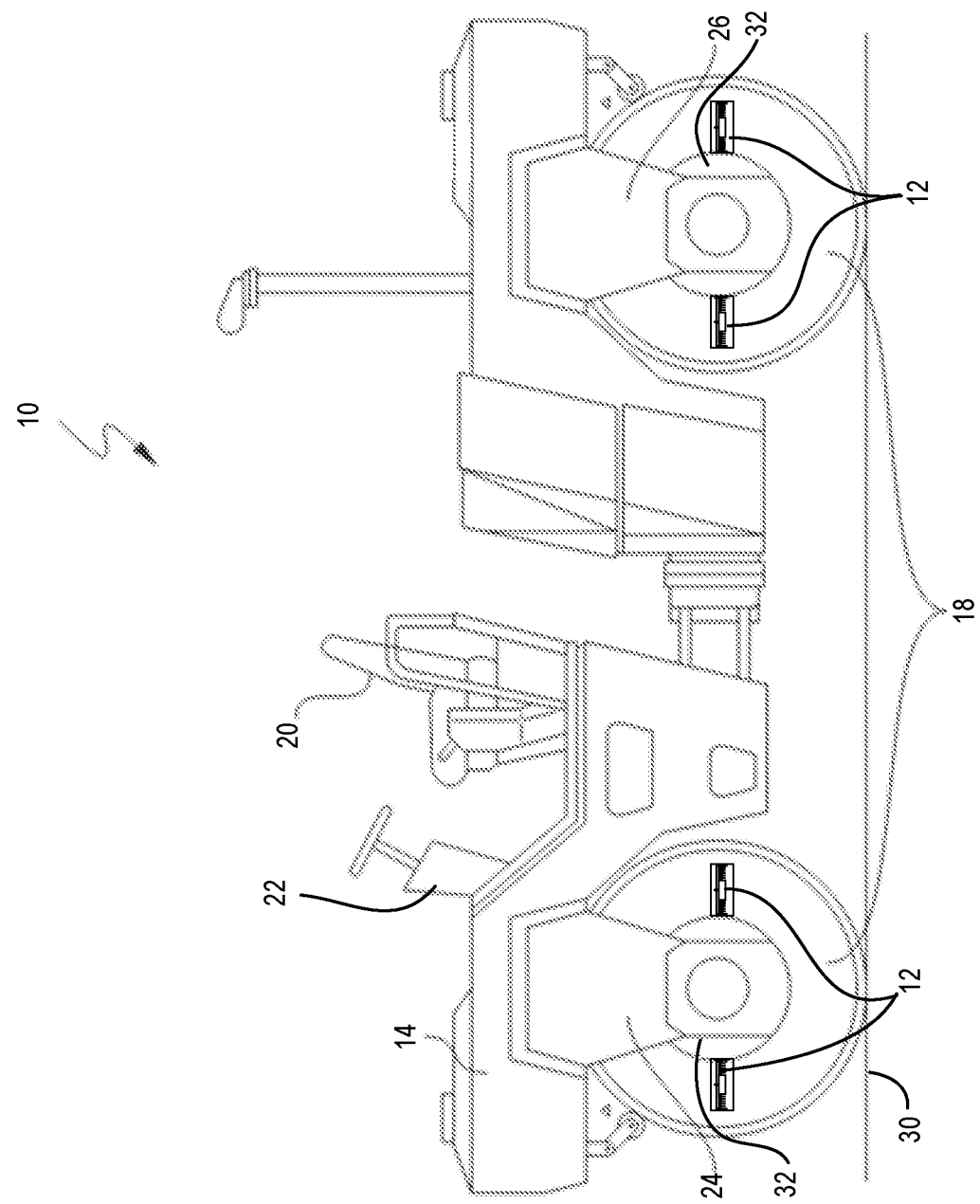
FIG. 1 illustrates a cross-sectional view of a self-propelled roller-type surface compaction machine having vibratory energy converter assemblies for converting unwanted horizontal vibration energy into electrical energy, according to an embodiment.

FIG. 1 illustrates a cross-sectional view of a self-propelled roller-type surface compaction machine 10 according to one embodiment. The surface compaction machine 10, which may also be referred to herein as a vibratory compaction machine, includes a body chassis structure 14, and rotatable drums 18 at the front and back of the body chassis structure 14. As shown, the body chassis structure 14 may include a driver station provided with a seat 20 and a steering mechanism 22 (e.g., a steering wheel) to provide driver control of the surface compaction machine 10. Moreover, each drum 18 may be coupled to the body chassis structure 14 using a respective yoke 24, 26. One or both of the drums 18 may be driven by a drive motor (not shown) to propel the surface compaction machine 10. The drums 18 have a cylindrical outer surface that forms a compacting surface for compacting an underlying substrate 30, such as asphalt, gravel, soil, etc. Those of ordinary skill in the art will appreciate, however, that other types of surface compaction machines are contemplated, such as a surface compaction machine with a single drum, for example, or other types of surface compaction machines and other equipment that utilize directional vibration energy.

Figure 2:
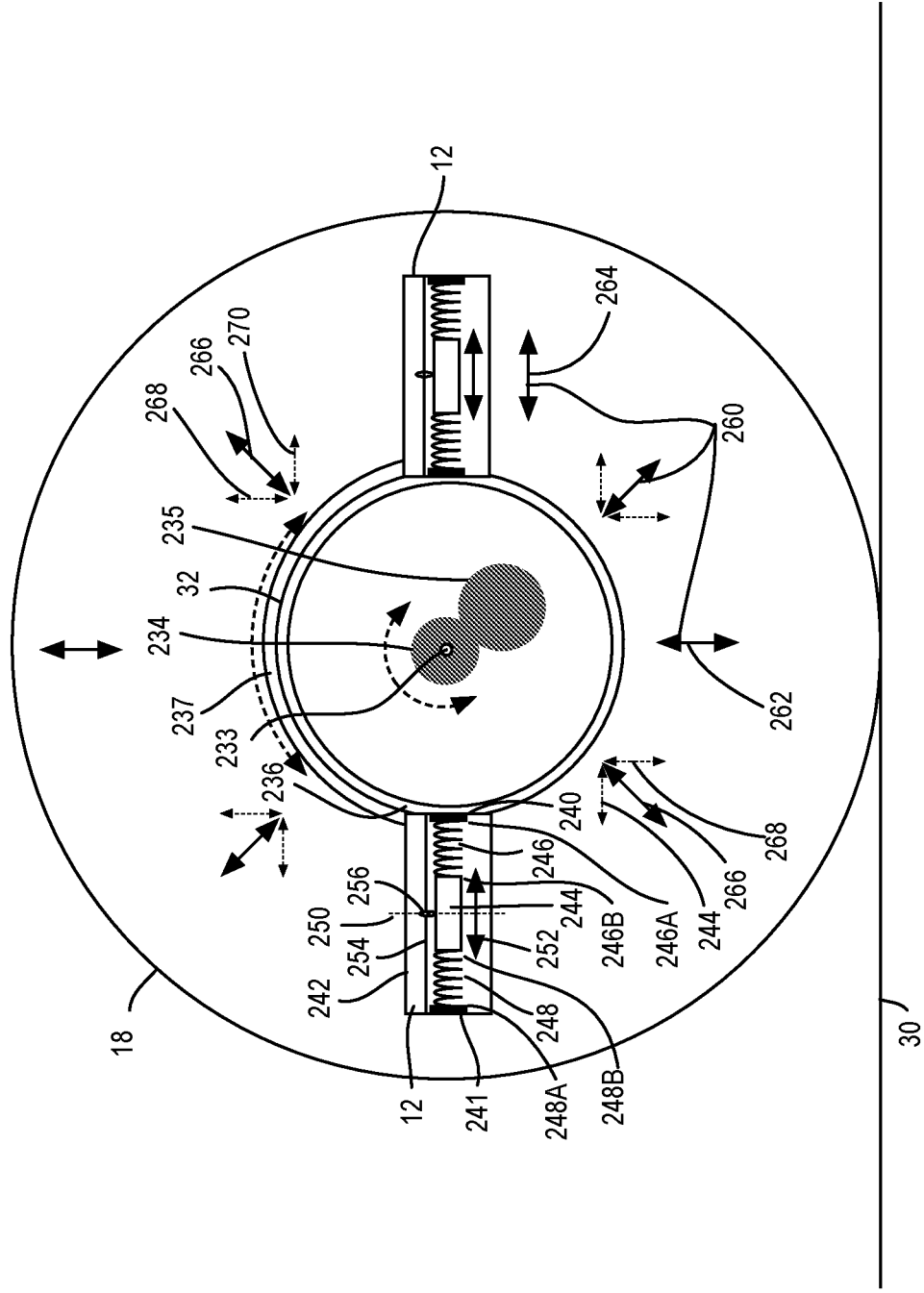
FIG. 2 illustrates a cross-sectional view of the roller drum of FIG. 1 showing additional details of the components of the vibration generator subassembly and vibratory energy converter assemblies, according to an embodiment.

Those of ordinary skill in the art will appreciate that one or both of the drums 18 include an eccentric vibration system 32 provided with a shaft 234 and an eccentric mass 235, as shown in FIG. 2, that rotate to generate vibration energy. The generated vibration energy is directed generally radially outwardly from an axis of rotation 233 of the shaft. As shown in FIG. 2, the eccentric vibration system 32 may be disposed to rotate within a stationary eccentric system housing 236.

Those of ordinary skill in the art will appreciate that to generate vibration, the shaft 234 and eccentric mass 235 are rotated about the axis of rotation 233 that is typically substantially coaxial with an axis of rotation of the drum 18. Since the eccentric mass 235 and shaft 234 have a center of mass that is radially offset from the axis of rotation 233 of the shaft 234, this rotation generates vibrations that are directed in all radial directions 260 from the axis of rotation 233.

Those of ordinary skill in the art will appreciate that a component of the vibration energy is directed in vertical radial directions 262 (e.g., along the y-axis) and oscillates sinusoidally. Similarly, a component of the vibration energy is directed in horizontal radial directions 264 (e.g., along the x-axis) and also oscillates sinusoidally (90 degrees out of phase with the vertical component).

The shaft 234 and eccentric mass 235 typically rotate together at different speeds to produce different vibrational frequencies, as desired. In some embodiments, the eccentric vibration system 32 may produce vibrational frequencies in the range of 1 Hz to 100 Hz. The specific frequencies or frequency ranges may be based on the type of surface compaction machine and/or type of substrate being compacted (e.g., soil, asphalt, etc.), with existing surface compaction machines typically having a lower range of about 15 Hz to 20 Hz.

Since only the vertical component of the vibration energy contributes to compaction, advantageously, in the present embodiment, vibratory energy converter assemblies 12 are provided to absorb and convert the horizontal components of the vibration energy generated by the eccentric vibration system 32 into electrical energy. In the example of FIG. 2, the vibratory energy converter assemblies 12 are coupled to the eccentric system housing 236 so that desirable vibration energy (i.e., that is directed in a vertical radial direction 262 in this example) is transferred to the substrate 30 to aid in compaction. Meanwhile, undesirable vibration energy (i.e., that is directed in a horizontal radial direction 264 in this example) is captured by the vibratory energy converter assemblies 12 for conversion into electrical energy, while reducing undue wear and tear on the machine and/or operator fatigue due to the undesirable vibration energy. For vibration energy that is directed in other directions 266 that have both a vertical component 268 and a horizontal component 270 (i.e., at oblique angles), the desirable vertical component 268 of the vibration energy is transferred to the substrate 30 for compaction, while the undesirable horizontal component 270 of the vibration energy is transferred to the vibratory energy converter assemblies 12 for conversion into electrical energy.

In this example, the eccentric system housing 236 remains substantially stationary with respect to the body chassis structure of the surface compaction machine, with the drum 18 rotating around the eccentric system housing 236, e.g., via a bearing assembly (not shown) between the eccentric system housing 236 and the drum 18. In this example, each vibratory energy converter assembly 12 is fixedly coupled to the eccentric system housing 236 and remains substantially horizontal with respect to the eccentric vibration system 32 and body chassis structure of the surface compaction machine. Those of ordinary skill in the art will also appreciate that the scale of various components shown in FIG. 2 et al. may be modified as desired. For example, the eccentric system housing 236 in this embodiment is illustrated as being relatively large to better illustrate the different directional components of the vibration energy being produced by the eccentric vibration system 32. Those of ordinary skill in the art will appreciate that it may be desirable to reduce the size of the eccentric system housing 236, so that the vibratory energy converter assemblies 12 are as close to the vibration source (e.g., the shaft 234 and eccentric mass 235 in this example) as possible.

Each vibratory energy converter assembly 12 includes a converter housing 242 having a first end 240 coupled to the eccentric system housing 236. The converter housing 242 extends from the eccentric system housing 236 radially away from the eccentric vibration system 32. The converter housing 242 carries an actuator 244 having a translational degree of freedom of movement with respect to the converter housing 242. In this example, the translational degree of freedom of movement is substantially horizontal and substantially parallel to horizontal component 270, so that vibration of the converter housing 242 by the eccentric vibration system 32 and/or other components of the vibratory compaction machine causes movement of the actuator 244 with respect to the converter housing 242 in a horizontal movement direction 252 that is substantially parallel to horizontal component 270. As will be discussed in greater detail below, a generator assembly converts the movement of the actuator 244 caused by the mechanical vibratory energy of the horizontal component 270 into electrical energy.

In this embodiment, resilient elements 246, 248 may mechanically connect the actuator 244 to the converter housing 242. In this example, a first resilient element 246 includes a first portion 246A that is fixedly attached proximate to the first end 240 of the converter housing 242 and a second portion 246B that includes a degree of freedom of movement relative to the converter housing 242, and that is proximate to the actuator 244. The second portion 246B may be fixedly coupled to the actuator 244 in some embodiments, and may operate to bias the actuator 244 within the converter housing 242 in some embodiments.

In this embodiment, a second resilient element 248 includes a first portion 248A that is fixedly attached proximate to the second end 241 of the converter housing 242 and a second portion 248B that includes a degree of freedom of movement relative to the converter housing 242, and that is proximate to the actuator 244 opposite the second portion 246B of the first resilient element 246. Similar to the first resilient element 246, the second portion 248B of the second resilient element 248 may be fixedly coupled to the actuator 244 in some embodiments, and may operate to bias the actuator 244 within the converter housing 242 in some embodiments. In this embodiment, for example, the first resilient element 246 and second resilient element 248 are biasing elements (e.g., springs), which bias the actuator 244 toward a neutral position 250 and which allow the actuator to oscillate in a horizontal movement direction 252, which is substantially parallel to the horizontal radial direction 264 discussed above, within the converter housing 242.

In this example, the converter housing 242 also includes a guide rod 254 extending substantially parallel to the horizontal movement direction 252. A ring bearing 256 is coupled to the actuator 244 and surrounds the guide rod 254 to prevent rotation of the actuator 244 as the actuator 244 travels in the horizontal movement direction 252. In this example, the actuator 244 is a linear actuator that does not convert rotational energy into electrical energy. Thus, by preventing vibratory energy from causing rotation of the actuator 244, additional vibratory energy is available for causing linear movement of the actuator 244 for conversion into electrical energy.

As discussed above, the vibratory energy converter assembly 12 may remain substantially stationary with respect to the body chassis structure of the surface compaction machine, with the horizontal movement direction 252 for each vibratory energy converter assembly 12 remaining substantially horizontal with respect to the eccentric vibration system 32 and body chassis structure of the surface compaction machine, so that movement of the actuator 244 captures the undesirable (i.e., horizontal) components of the vibration without interfering with the desirable (i.e. vertical) components. As shown at 237 in FIG. 2, in some embodiments, the eccentric system housing 236 may be selectively rotatable with respect to the eccentric vibration system 32, or vice versa, to reorient an angle of the vibratory energy converter assembly 12. This selective rotation may maintain the vibratory energy converter assembly 12 as a predetermined angle with respect to the body chassis structure, in response to a change in angle of the body chassis structure, or may re-orient the vibratory energy converter assembly 12 to a different predetermined angle with respect to the body chassis structure, as desired. For example, the compaction mechanism could be reoriented to compact at a non-vertical angle (e.g., on a hill or incline) by selectively rotating the vibratory energy converter assembly 12 to be substantially parallel to the incline, so that the vibration perpendicular to the incline is allowed to aid in compaction while vibration that does not aid in compaction is absorbed. In another example, the eccentric system housing 236 may be fixedly coupled to the drum 18 and may rotate with the drum 18, with the vibratory energy converter assembly 12 being selectively rotatable about the eccentric system housing 236, via a bearing assembly (not shown) between the vibratory energy converter assembly 12 and the eccentric system housing 236 for example, to maintain a predetermined angle with respect to the body chassis structure or substrate 30.

Figure 3A:
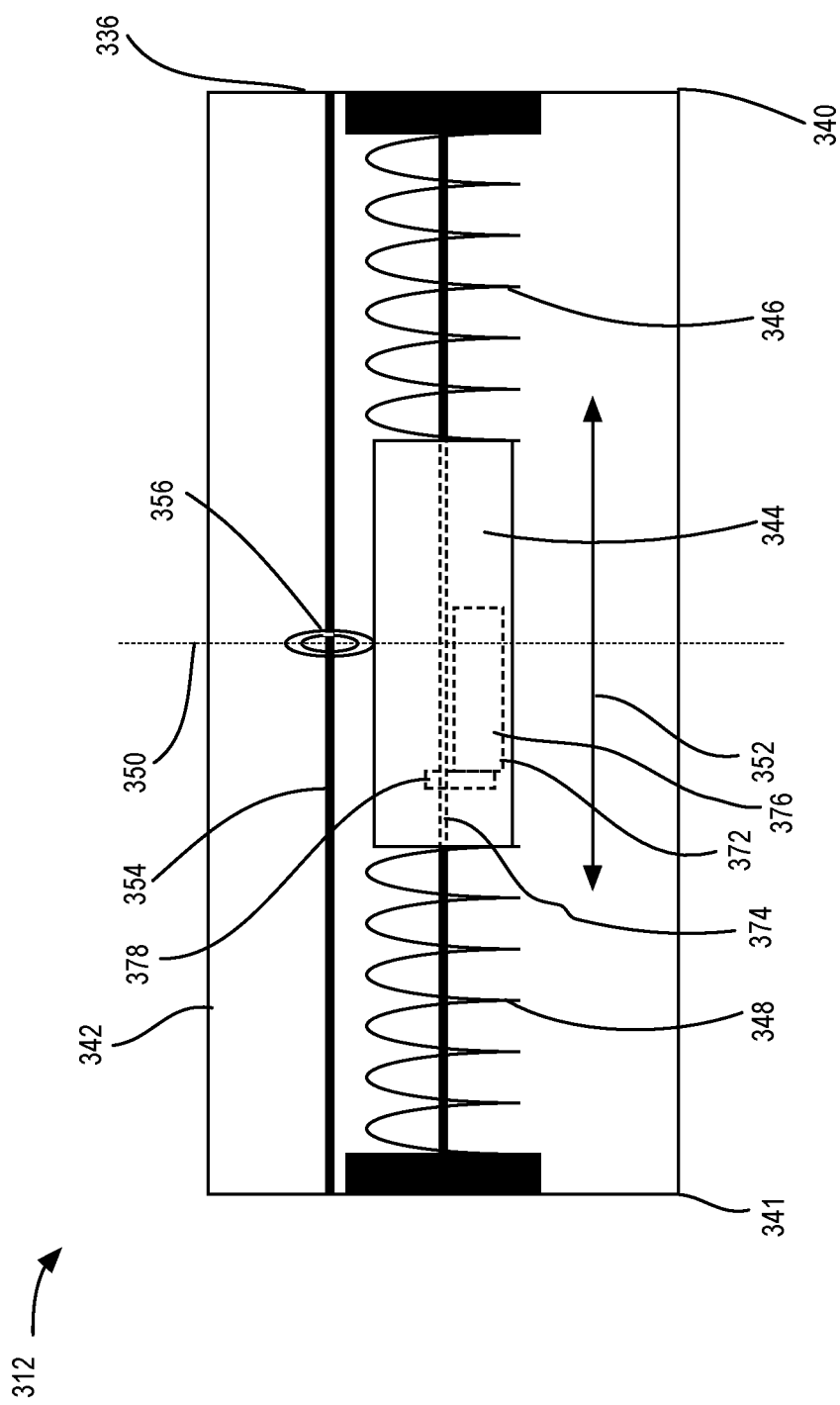
FIGS. 3A and 3B illustrate views of another vibratory energy converter assembly similar to the vibratory energy converter assemblies of FIGS. 1 and 2, according to some embodiments.
Figure 3B:
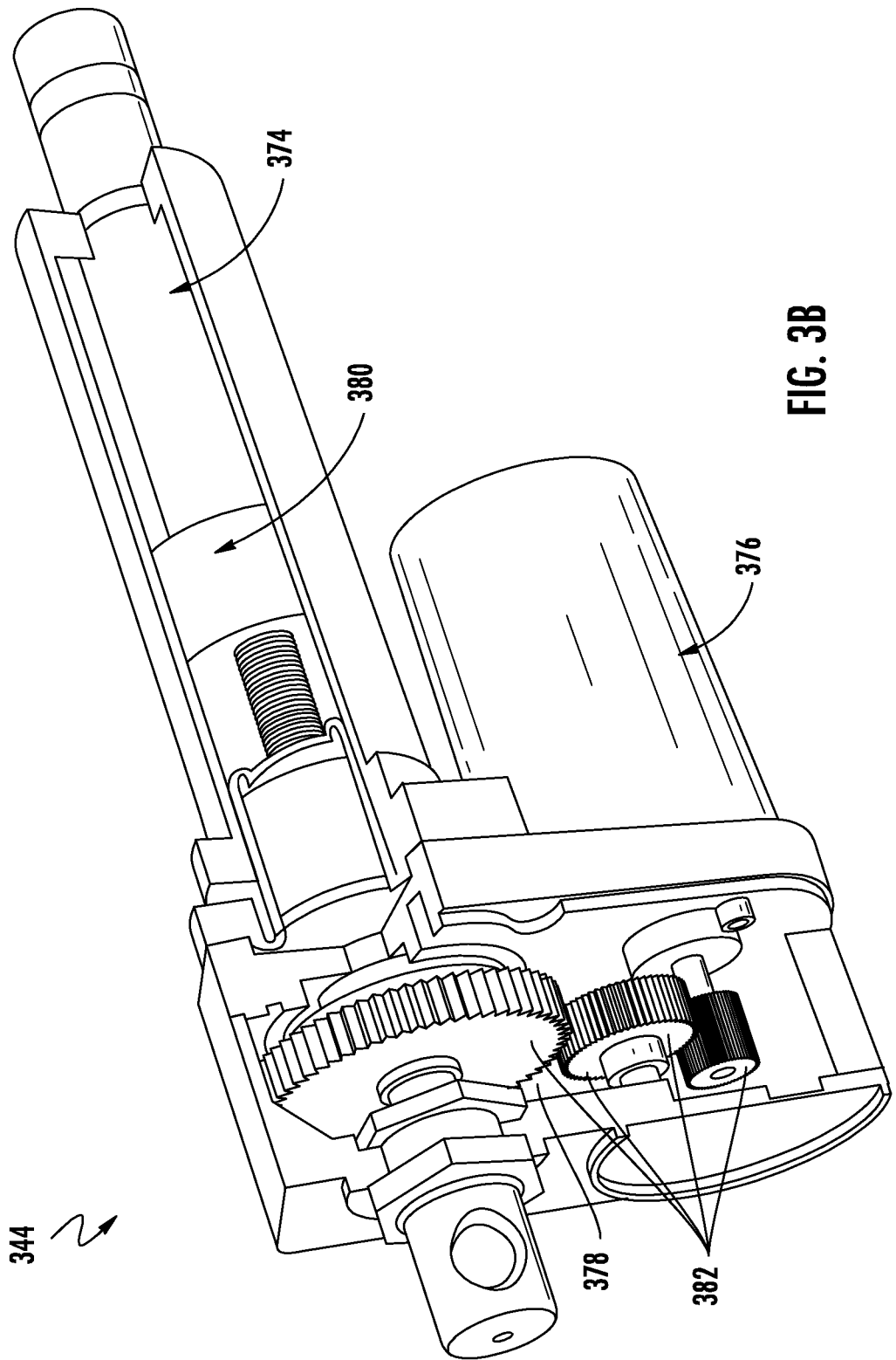

Referring now to FIGS. 3A and 3B, another vibratory energy converter assembly 312 similar to the vibratory energy converter assemblies 12 of FIGS. 1 and 2 is illustrated, according to some embodiments. The vibratory energy converter assembly 312 includes a converter housing 342 that carries an actuator 344 and that has a first end 340 coupled to an eccentric system housing 336 of an eccentric vibration system and a second end 341 opposite the first end 340. The actuator 344 is coupled between two resilient elements 346, 348 (e.g., springs) that bias the actuator toward a neutral position 350 within the converter housing 342 and that transfer vibration energy received though the eccentric system housing 336 to cause the actuator 344 to move in a horizontal movement direction 352 within the converter housing 342.

In this example, the actuator 344 includes a generator subassembly 372 that is driven by a drive rod 374 in response to movement of the actuator 344 in the horizontal movement direction 352. The drive rod 374 is fixed within the converter housing 342 and extends substantially parallel to the horizontal movement direction 352. As the actuator 344 moves with respect to the drive rod 374 in the horizontal movement direction 352, a guide rod 354 coupled to the converter housing and a guide rod bearing 356 coupled to the actuator 344 prevent rotation of the actuator 344 with respect to the converter housing 342.

The drive rod 374 is coupled to a generator 376 within the actuator 244 via a mechanical linkage 378. As shown by FIG. 3B, the mechanical linkage 378 may include a ball screw 380 that rotates in response to linear movement of the actuator 344 and/or drive rod 374, and a gear assembly 382 that is driven by the rotation of the ball screw 380 to drive the generator 376 and generate electrical power. The generated electrical power may be stored or may be used to drive other components, for example.

Figure 4:
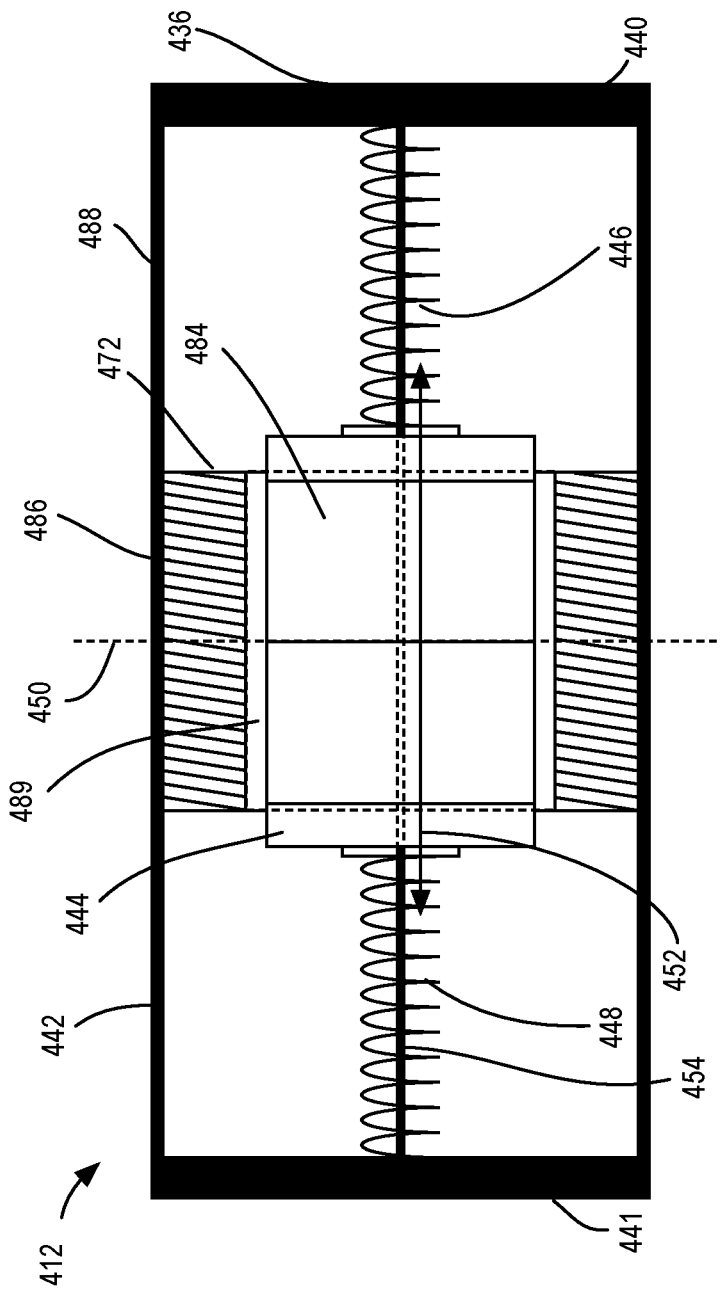
FIG. 4 illustrates a cross-sectional view of an alternative vibratory energy converter assembly suitable for use with the embodiment of FIGS. 1 and 2, according to an embodiment.

Those of ordinary skill in the art will appreciate that other types of generator assemblies may be used as well. In this regard, FIG. 4 illustrate a cross-sectional view of another vibratory energy converter assembly 412 suitable for use with the embodiment of FIGS. 1 and 2, according to an embodiment. Similar to the vibratory energy converter assembly 312 of FIGS. 3A and 3B, the vibratory energy converter assembly 412 of FIG. 4 includes a converter housing 442 that carries an actuator 444 and that has a first end 440 coupled to an eccentric system housing 336 of an eccentric vibration system and a second end 441 opposite the first end 440. The actuator 444 is coupled between two resilient elements 446, 448 (e.g., springs) that bias the actuator toward a neutral position 450 within the converter housing 442 and that transfer vibration energy received though the eccentric system housing 436 to cause the actuator 444 to move in a horizontal movement direction 452 within the converter housing 442.

In this example, the actuator 444 includes a magnetic element 484 and the generator subassembly 472 includes a metallic coil 486 that is fixed with respect to the converter housing 442. In this example, the converter housing 442 is a tube 488 that entirely encloses the actuator 444, with the metallic coil 486 wound within a portion of the tube 488 that surrounds the path of the actuator 444, with an air gap 489 between the metallic coil 486 and the actuator 444. In this example, a guide rod 454 also guides the actuator 444 to prevent the actuator 444 from sagging within the converter housing 442 and/or contacting the metallic coil 486. Those of ordinary skill in the art will appreciate, however, that other types of structures may be used to position the metallic coil 486 and guide the actuator 444. As the actuator 444 moves in the horizontal movement direction 452, which is substantially parallel to horizontal component 270, with respect to the converter housing 442, the magnetic element 484 moves through an interior volume defined by the metallic coil 486, and induces an electrical current within the metallic coil 486. The electrical power that is generated by this induced current may be used to drive other components, or may be rectified by power circuitry and stored, for example.

Figure 5A:
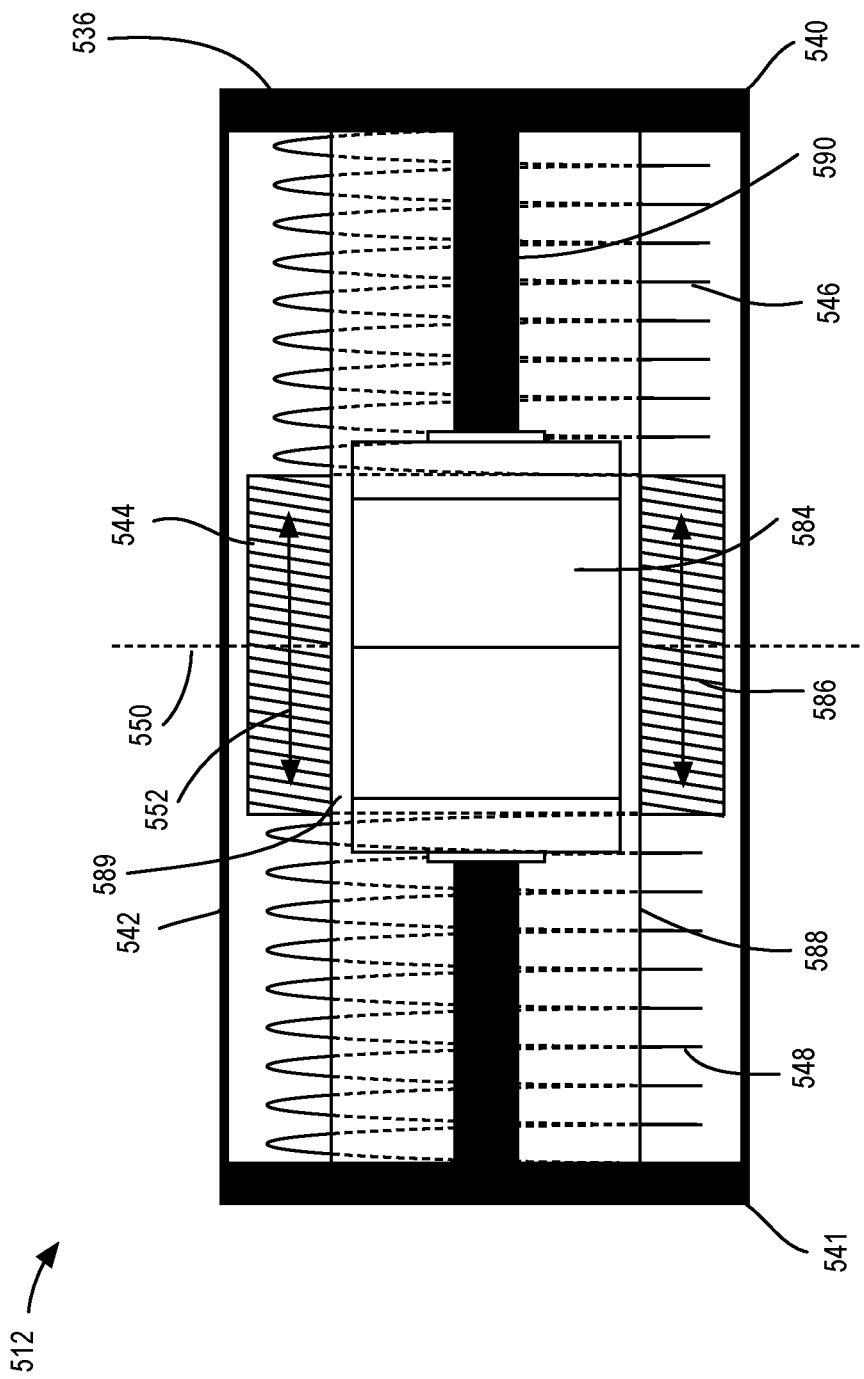
FIGS. 5A and 5B illustrate a cross-sectional views of another alternative vibratory energy converter assembly similar to the vibratory energy converter assembly of FIG. 3, and that is suitable for use with the embodiment of FIGS. 1 and 2, according to an embodiment.
Figure 5B:
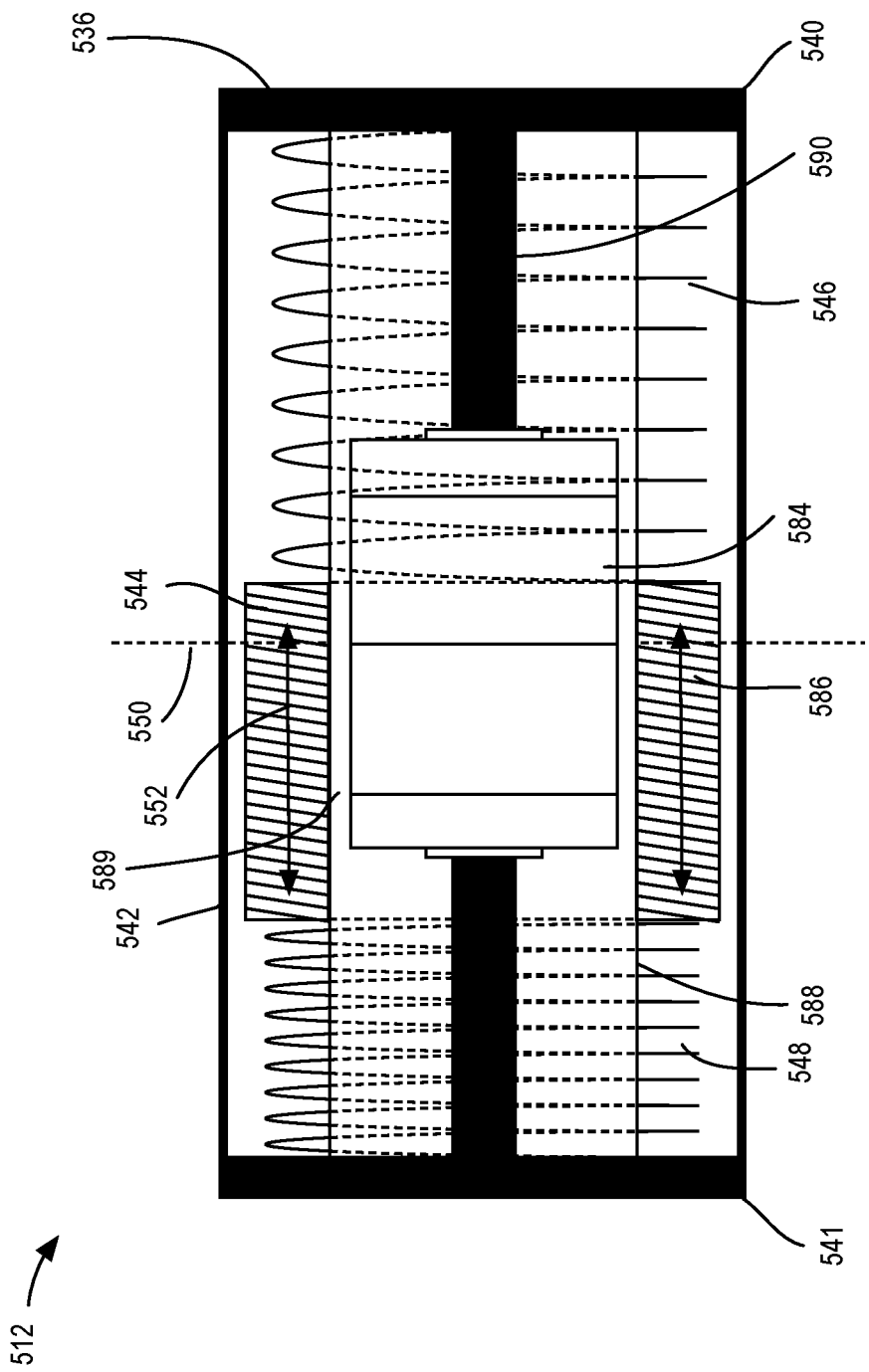

In another embodiment, FIGS. 5A and 5B illustrates a vibratory energy converter assembly 512 having a converter housing 542 that carries an actuator 544 and that has a first end 540 coupled to an eccentric system housing 336 of an eccentric vibration system and a second end 541 opposite the first end 540. As shown by FIG. 5A, the actuator 544 is coupled between two resilient elements 546, 548 (e.g., springs) that bias the actuator toward a neutral position 550 within the converter housing 542 and that transfer vibration energy received though the eccentric system housing 536 to cause the actuator 544 to move in a horizontal movement direction 552, which is substantially parallel to horizontal component, within the converter housing 542.

In this embodiment, a magnetic element 584 is fixedly coupled to the converter housing 542 via a pair of rods 590. The magnetic element 584 is fixed with respect to the converter housing 542, and a metallic coil 586 is fixed with respect to the actuator 544, with the metallic coil 586 defining an air gap 589 between the metallic coil 586 and the magnetic element 584. In this example, the magnetic element 584 is suspended within a guide tube 588, with the actuator 544 and resilient elements 546, 548 surrounding the guide tube 588 so that the actuator 544 is supported by the guide tube 588 during horizontal movement of the actuator 544, and so that the air gap 589 is maintained. As shown by FIG. 5B, movement of the actuator 544 with respect to the converter housing 542 causes the metallic coil 586 to move with respect to the fixed magnetic element 584, thereby causing relative movement of the magnetic element 584 with respect to the metallic coil 586 the interior volume of the metallic coil 586. The relative movement of the magnetic element 584 within the interior volume of the metallic coil 586 induces an electrical current within the metallic coil 586.

Figure 6:
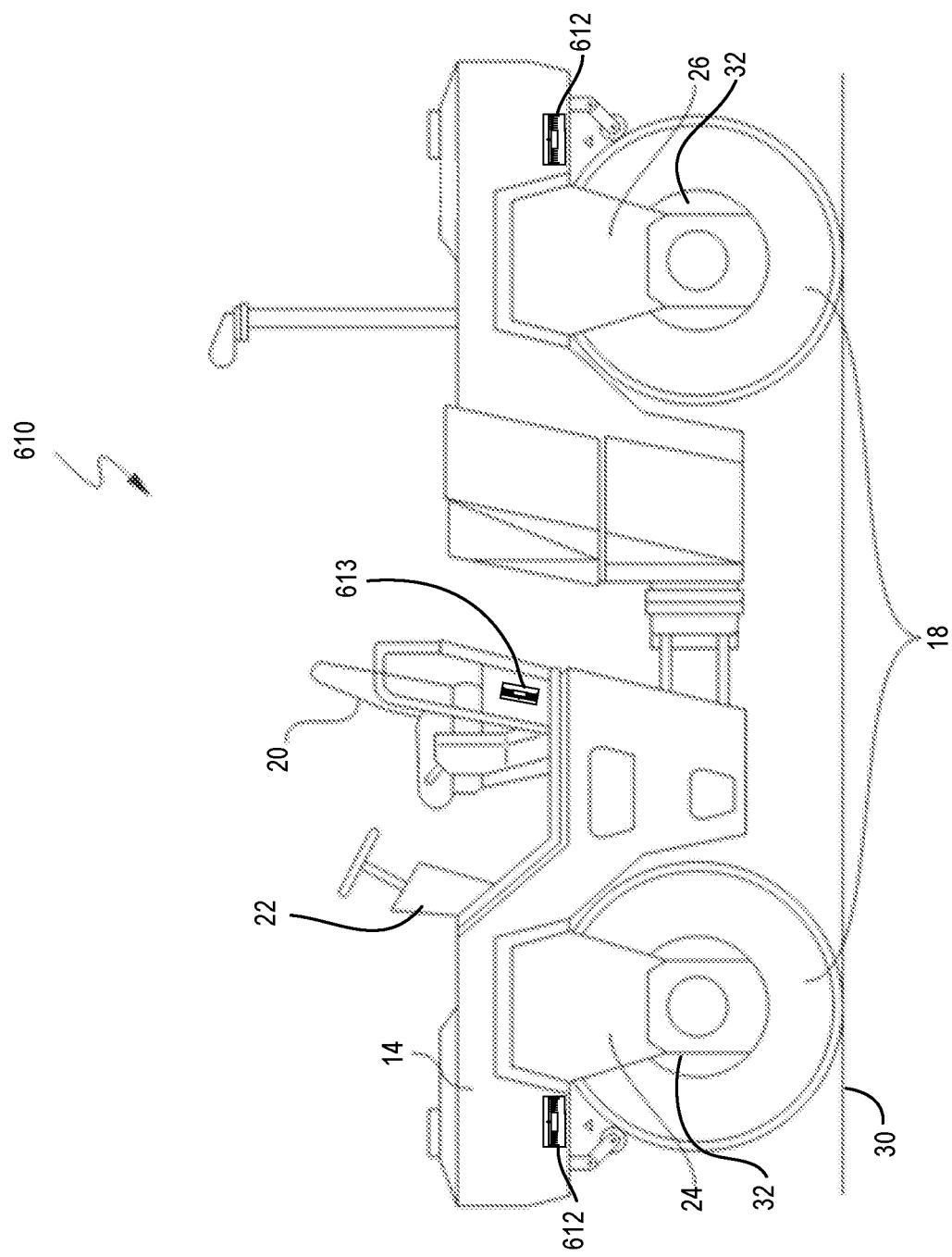
FIG. 6 illustrates a cross-sectional view of another surface compaction machine having vibratory energy converter assemblies at different positions and orientations, according to an embodiment.

In general, it may be advantageous to locate vibratory energy converter assemblies as close to the source of vibration as possible, to increase efficiency and/or reduce the amount of unwanted vibration elsewhere in the body chassis structure. In FIG. 1, for example, the vibratory energy converter assemblies 12 are coupled to the eccentric vibration system 32, which is the primary source of sustained vibration in the surface compaction machine 10, but those of ordinary skill in the art will appreciate that similar vibratory energy converter assemblies may be positioned anywhere in or on the surface compaction machine 10, as desired. In this regard, FIG. 6 illustrates another surface compaction machine 610, similar to the surface compaction machine 10 of FIG. 1, having vibratory energy converter assemblies 612, 613 at different positions and orientations.

In this embodiment, vibratory energy converter assemblies 612 are located on the body chassis structure 14 relatively close to the eccentric vibration system 32 and are oriented generally horizontally, to absorb unwanted horizontal vibration from the eccentric vibration systems 32. The roller compaction machine 610 in this embodiment also includes a smaller vibratory energy converter assembly 613 positioned and oriented near the seat 20 of the surface compaction machine 610, to reduce vibration in the seat 20 and to convert unwanted vibration into electrical energy. Because the sustained vibrations caused by the eccentric vibration system 32 in this embodiment may be significantly smaller within the body chassis structure 14, the applications for the different vibratory energy converter assemblies 612, 613 may vary based on the amount of vibratory energy being converted. For example, the relatively small amounts of electrical energy generated by the vibratory energy converter assemblies 612, 613 may be used to power low-energy devices or components of the surface compaction machine 610, such as microelectronics and/or self-powered sensors (not shown), for example.

Those of ordinary skill in the art will also appreciate that different types of vehicles may experience different types of vibration, which may change the optimal positions and orientations for the vibratory energy converter assemblies. For example, a vehicle that is designed to move over rough terrain (not shown) may experience much larger vibrations in its body chassis structure than the vibrations in the body chassis structure 14 of the roller compactor machines 10, 610 of FIGS. 1 and 6. In these and other embodiments, the locations and orientations of vibratory energy converter assemblies on the vehicle may be optimized based on determining the locations and orientations of maximum vibration within the vehicle.

When an element is referred to as being "connected", "coupled", "responsive", "mounted", or variants thereof to another element, it can be directly connected, coupled, responsive, or mounted to the other element or intervening elements may be present. In contrast, when an element is referred to as being "directly connected", "directly coupled", "directly responsive", "directly mounted" or variants thereof to another element, there are no intervening elements present. Like numbers refer to like elements throughout. As used herein, the singular forms "a", "an" and "the" are intended to include the plural forms as well, unless the context clearly indicates otherwise. Well-known functions or constructions may not be described in detail for brevity and/or clarity. The term "and/or" and its abbreviation "/" include any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but do not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Persons skilled in the art will recognize that certain elements of the above-described embodiments may variously be combined or eliminated to create further embodiments, and such further embodiments fall within the scope and teachings of inventive concepts. It will also be apparent to those of ordinary skill in the art that the above-described embodiments may be combined in whole or in part to create additional embodiments within the scope and teachings of inventive concepts. Thus, although specific embodiments of, and examples for, inventive concepts are described herein for illustrative purposes, various equivalent modifications are possible within the scope of inventive concepts, as those skilled in the relevant art will recognize. Accordingly, the scope of inventive concepts is determined from the appended claims and equivalents thereof.

The invention claimed is:

1. A vibratory energy converter assembly for a vibratory compaction machine comprising:
   a housing coupled to an eccentric vibration system of the vibratory compaction machine;
   an actuator that is carried by the housing and that comprises a translational degree of freedom of movement with respect to the housing, wherein vibration of the housing by the vibratory compaction machine causes movement of the actuator with respect to the housing in a first direction; and
   a generator subassembly coupled to the actuator to convert mechanical vibratory energy of the movement of the actuator into electrical energy, the generator subassembly comprising a generator fixed with respect to the actuator, wherein the vibratory energy converter assembly further comprises a mechanical linkage coupled between the housing and the generator to drive the generator in response to the movement of the actuator with respect to the housing.

2. The vibratory energy converter assembly of claim 1, further comprising a first resilient element comprising a first portion that is fixedly attached relative to the converter housing and a second portion attached to the actuator that comprises the translational degree of freedom of movement with respect to the converter housing.

3. The vibratory energy converter assembly of claim 2, further comprising a second resilient element comprising a first portion that is fixedly attached relative to the converter housing and a second portion attached to the actuator that comprises the translational degree of freedom of movement with respect to the converter housing,
   wherein the first portion of the first resilient element is coupled to a first end of the converter housing, and
   wherein the first portion of the second resilient element is coupled to a second end of the converter housing opposite the first end.

4. The vibratory energy converter assembly of claim 3, wherein the first resilient element comprises a first spring, and
   wherein the second resilient element comprises a second spring.

5. The vibratory energy converter assembly of claim 1, wherein the mechanical linkage comprises a gear linkage coupled between the converter housing and the generator.

6. The vibratory energy converter assembly of claim 5, wherein the converter housing further comprises a drive rod coupled to the gear linkage, and
   wherein the movement of the actuator with respect to the converter housing causes the drive rod to drive the gear linkage to drive the generator.

7. The vibratory energy converter assembly of claim 1, wherein the generator subassembly comprises:
   a magnetic element that is fixed with respect to the actuator; and
   a metallic coil that is fixed with respect to the converter housing, the metallic coil defining an interior volume,
   wherein the movement of the actuator with respect to the converter housing causes the magnetic element to move through the interior volume of the metallic coil, and
   wherein the movement of the magnetic element through the interior volume of the metallic coil induces an electrical current within the metallic coil.

8. The vibratory energy converter assembly of claim 1, wherein the generator subassembly comprises:
   a magnetic element that is fixed with respect to the converter housing; and
   a metallic coil that is fixed with respect to the actuator, the metallic coil defining an interior volume,
   wherein movement of the actuator with respect to the converter housing causes relative movement of the metallic coil with respect to the magnetic element, within the interior volume of the metallic coil, and
   wherein the relative movement of the magnetic element within the interior volume of the metallic coil induces an electrical current within the metallic coil.

9. The vibratory energy converter assembly of claim 1, further comprising a guide rod coupled within the converter housing, and
   wherein the actuator comprises a guide rod bearing engaged with the guide rod to inhibit rotation of the actuator during the movement of the actuator with respect to the converter housing.

10. The vibratory energy converter assembly of claim 1, wherein the converter housing forms an interior that encloses the actuator.

11. The vibratory energy converter assembly of claim 1, further comprising:
    an electrical energy storage device electrically coupled to the generator subassembly to store the electrical energy converted from the mechanical vibratory energy by the generator subassembly.

12. The vibratory energy converter assembly of claim 1, wherein the converter housing is coupled to the eccentric vibration system, wherein the movement of the actuator caused by the vibration of the converter housing inhibits vibration of the eccentric vibration system in the first direction, the vibratory energy converter assembly further comprising:

a roller drum for the vibratory compaction machine coupled to the eccentric vibration system of the vibratory compaction machine to which the converter housing of the vibratory energy converter assembly is configured to be coupled, wherein the roller drum encloses the eccentric vibration system, the converter housing, and the actuator, wherein vibration of the eccentric vibration system causes the roller drum to vibrate in a second direction different from the first direction.

13. The vibratory energy converter assembly of claim 12, wherein the second direction is substantially orthogonal to the first direction.

14. The vibratory energy converter assembly of claim 12, wherein the converter housing of the vibratory energy converter assembly is fixedly coupled to the housing and extends from the housing in the first direction.

15. The vibratory energy converter assembly of claim 1, further comprising a body chassis structure for the vibratory compaction machine, wherein the converter housing of the vibratory energy converter assembly is coupled to the body chassis structure.

16. A vibratory energy converter system comprising:
an eccentric vibration system; and
a plurality of vibratory energy converter assemblies, each vibratory energy converter assembly comprising:
a housing coupled to the eccentric vibration system;
an actuator that is carried by the housing and that comprises a translational degree of freedom of movement with respect to the housing, wherein vibration of the eccentric vibration system causes movement of the actuator with respect to the housing in a first direction;
a generator subassembly coupled to the actuator to convert mechanical vibratory energy of the movement of the actuator into electrical energy, the generator subassembly comprising a generator fixed with respect to the actuator; and
a mechanical linkage coupled between the housing and the generator to drive the generator in response to the movement of the actuator with respect to the housing.

17. A vibratory compaction machine comprising:
a body chassis structure;
a roller drum rotatably coupled to the body chassis structure; and
the vibratory energy converter system of claim 16,
wherein the eccentric vibration system is disposed in the roller drum,
wherein vibration of the eccentric vibration system causes vibration of the roller drum in a second direction substantially orthogonal to the first direction, and
wherein movement of the actuator in the first direction inhibits vibration of the roller drum in the first direction.

* * * * *